United States Patent
Yoon et al.

(10) Patent No.: US 6,396,868 B1
(45) Date of Patent: May 28, 2002

(54) SPREAD SPECTRUM SIGNAL GENERATING DEVICE AND METHOD IN TRANSMITTER OF MOBILE COMMUNICATIONS SYSTEM

(75) Inventors: Soon-Young Yoon; Jae-Min Ahn; Hee-Won Kang; Young-Ky Kim, all of Seoul; Jong-Seon No, Songnam-shi; Hong-Yeop Song, Seoul; Ha-Bong Chung, Kwachon-shi; Je-Woo Kim, Songnam-shi, all of (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/135,990

(22) Filed: Aug. 18, 1998

(30) Foreign Application Priority Data

Aug. 18, 1997 (KR) .......................................... 97-39200

(51) Int. Cl.$^7$ ............................................. H04B 1/707
(52) U.S. Cl. ...................................... 375/146; 370/342
(58) Field of Search ................................ 375/130, 140, 375/142, 146, 150; 370/320, 335, 342, 441

(56) References Cited

U.S. PATENT DOCUMENTS 5,943,361 A * 8/1999 Gilhousen et al. .......... 375/130
5,963,548 A * 10/1999 Virtanen ....................... 370/335
6,137,825 A * 10/2000 Sekine et al. ................ 375/130

FOREIGN PATENT DOCUMENTS

WO          9901994          1/1999

* cited by examiner

*Primary Examiner*—Don N. Vo
(74) *Attorney, Agent, or Firm*—Dilworth & Barrese, LLP

(57) ABSTRACT

There are provided spread spectrum signal generating devices and methods in a transmitter of a mobile communications system using a plurality of logical channels. In the spread spectrum signal generating devices, a multiplexer time multiplexes a pilot channel signal and a control channel signal which are output at substantially constant power levels. A first orthogonal encoder orthogonally spreads the output of the multiplexer with an orthogonal code. A second orthogonal encoder orthogonally spreads voice channel data of a variable bit rate with an orthogonal code. A third orthogonal encoder orthogonally spreads packet channel data of a variable bit rate with an orthogonal code. An IQ signal mapper adds the outputs of the first and third orthogonal encoders, outputs the added signal as a first channel signal, and outputs the output of the second orthogonal encoder as a second channel signal. A PN spreader spreads the first and second channel signals with PN codes and outputs a final spectrum spread signal, which exhibits a substantially minimized peak-to-average power ratio.

17 Claims, 12 Drawing Sheets

SPREAD SPECTRUM SIGNAL GENERATING DEVICE AND METHOD IN TRANSMITTER OF MOBILE COMMUNICATIONS SYSTEM

BACKGROUND OF THE INVENTION

1. Field of the Invention

The present invention generally relates to a transmitter and a transmitting method in a spread spectrum mobile communications system, and in particular, to a spread spectrum signal generating device and method for maintaining a minimal transmitted output peak-to-average power.

2. Description of the Related Art

With the advent of CDMA (Code Division Multiple Access) mobile communications systems, various DSS (Direct Spread Spectrum) transmission and reception schemes have been explored. Coherent demodulation is known to be an effective way of increasing the subscriber capacity of a DSS-CDMA mobile communications system. This is largely due to a small signal-to-noise ratio which is generally required to obtain a given frame error rate in a coherent system, as compared to an incoherent demodulation system.

To realize coherent demodulation in a mobile communications environment, the complex gain of a received multipath channel signal on each path should be obtained. Complex gains can be calculated using a decision directed method or a pilot assisted method. The latter is generally used as it exhibits excellent performance and easy realization. The article entitled "Performance of Adaptive Match Filter Receivers Over Fading Multipath Channels" by Pahlavan and Matthews, IEEE Transactions on Communications, Vol. 38, No. 12, December 1990, pp. 2106–2113 provides more detailed information regarding the pilot assisted gain calculation method.

The pilot assisted method is implemented either by a parallel probing technique or serial probing technique. In parallel probing, a transmitter spreads a spread user data signal which includes both information and data known to a receiver with different PN (Pseudo random Noise) sequences. On the other hand, in serial probing, data known to the receiver is periodically inserted in the spread user data signal which includes information and then these signals are spread with the same PN symbol.

For CDMA mobile radio communications, a user needs to transmit various forms of data such as voice data, control data, and packet data for high-speed data and multimedia service. Two conditions need to be considered for such data transmission systems. First, it is desirable to minimize a peak-to-average power ratio (PAR) at an output port of a communications terminal in order to decrease both power dissipation and manufacturing cost of the terminal. Second, intermittent output power from the terminal should be minimized as this may cause another device carried by a user, such as a hearing aid or a cardiac pacemaker, to malfunction. The serial probing method is inferior to the parallel probing in terms of moderating intermittent output power, but offers advantages over the parallel probing method in terms of PAR.

FIG. 1 is a block diagram of a transmitter for generating a transmission signal including a pilot signal on a reverse link in a point-to-point spread spectrum CDMA cellular communications system.

Referring to FIG. 1, a logical channel data generator 111 has a plurality of data generators for generating channel data, and a plurality of scramblers for scrambling the channel data. A channelizer 113 processes the data received from the logical channel data generator 111 in such a manner that both interference between channels and the PAR is minimized. An IQ signal mapper 115 maps the channelized signals received from the channelizer 113 into in-phase and quadrature-phase signals. A PN spreader 117 spreads the output of the IQ signal mapper 115 with PN codes. A baseband modulator 119 translates the spread signal received from the PN spreader 117 to a baseband signal and modulates the baseband signal. A frequency upconverter 121 upconverts the frequency of the modulated signal received from the baseband modulator 119 to a transmission frequency and outputs a radio transmission signal.

FIG. 2A is a block diagram of the logical channel data generator 111 shown in FIG. 1, and FIG. 2B is a block diagram of the scramblers shown in FIG. 2A.

Referring to FIG. 2A, the logical channel data generator 111 includes a pilot data generator 211, a control data generator 213, a voice data generator 215, and a packet data generator 217. The pilot data generator 211 outputs unmodulated consecutive bits 0s. Control data generated from the control data generator 213 is composed of a power control command for power control on a forward link or other control information. The voice data generator 215 outputs data from a variable bit rate (VBR) vocoder. The voice data output from the vocoder can be, for example, a convolutionally encoded and interleaved bit sequence. The encoded voice data is output at a VBR of 1/2, 1/4, or 1/8, increasing the period of one bit time by two times, four times, or eight times, respectively. The packet data generator 217 has an output bit rate which is an integer multiple (from 1 to 8) of the highest bit rate of the voice data generator 215.

Scramblers 219, 221, and 223 scramble the data received from the control data generator 213, the voice data generator 215, and the packet data generator 217, respectively.

Referring to FIG. 2B, a switch 232 of the scramblers 219, 221, or 223 selectively outputs the output of a decimator 233 or data "0", and an exclusive OR gate 231 exclusive-ORs the data received from the data generators 213, 215, or 217 with the output of the decimator 233 or the data "0" selected by the switch 232. The decimator 233 decimates a second PN code sequence (i.e., long PN code sequence) P at the same bit rate as that of the control, voice, and packet data, which were all encoded and interleaved.

FIGS. 3A and 3B are block diagrams of the channelizer 113 shown in FIG. 1, which are configured for the serial and parallel probe methods, respectively. Referring to FIG. 3A, rate adaptors 311 to 317 are connected to the respective data generators 211 to 217 and adjust the data rates at the data generators 211 to 217. Signal mappers 321 to 327, which are connected to the respective rate adaptors 311 to 317, convert bits 0s and 1s of rate-adapted data to +1s and −1s, respectively. Multipliers 331 to 337 multiply the converted signals received from the signal mappers 321 to 327 by corresponding channel amplitude control signals A0 to A3. A multiplexer 341 multiplexes the outputs of the multipliers 331 to 337.

In the channelizer 113 using the serial probe scheme, the various data is time multiplexed to an output $C_0$ to occupy a different time slot therein and the time that the data occupies is adjusted by varying the number of repetitions on the outputs of the data generators 211 to 217 in the rate-adaptors 311 to 317.

The rate-adapted data is converted from logical channel data 0s and 1s to +1s and −1s suitable for transmission by the signal converters 321 to 327. The output signal from the signal converters 321 to 327 are applied to the multipliers 331 to 337, which multiply the converted signals by channel amplitude control signals A0 to A3, thereby determining the power levels.

Referring to FIG. 3B, rate adaptors 351 to 357 are connected to the data generators 211 to 217 of the logical channel data generator 111 and adjust data transmission rates at the corresponding data generators 211 to 217. Signal mappers 361 to 367 are connected to the corresponding rate adaptors 351 to 357, for converting bits 0s and 1s of rate-adapted data to +1s and −1s, respectively. Walsh code generators 371 to 377 generate Walsh codes W0 to W3, respectively. Multipliers 381 to 387 multiply signals received from the signal mappers 321 to 327 by the Walsh codes W0 to W3 received from the Walsh code generators 371 to 377, to remove both interference between channels and phase errors. Multipliers 391 to 397 multiply the outputs of the multipliers 381 to 387 by the corresponding channel amplitude control signals A0 to A3, thereby controlling the channel amplitude of the signals.

In the channelizer 113 using the parallel probe method, the occupation time of each data is adjusted by varying the number of repetitions on the outputs of the data generators 211 to 217 by the rate adaptors 351 to 357. The rate-adapted data is converted from logical channel data 0s and 1s to +1s and −1s suitable for transmission by the signal mappers 361 to 367, and multiplied by the mutually orthogonal Walsh codes by the multipliers 381 to 387, thereby reducing interference between channels and phase error-induced performance deterioration. The outputs of the multipliers 381 to 387 are multiplied by the corresponding channel amplitude control signals A0 to A3 by the multipliers 391 to 397 so that power levels are determined.

FIG. 4A is a block diagram of the IQ signal mapper 115 shown in FIG. 1, which is connected to the channelizer 113 when implementing the serial probe scheme. FIG. 4B is a block diagram of the IQ signal mapper 115 shown in FIG. 1, which is connected to the channelizer 113 for the parallel probe scheme. The IQ signal mapper 115 maps a channelized signal into both in-phase and quadrature-phase signals.

Because the final output $C_0$ of the channelizer 113 using the serial probe scheme is multiplexed data, the IQ signal mapper 115 of FIG. 4A is provided with a serial-to-parallel converter 411 for separating the multiplexed signal into odd-numbered bits and even-numbered bits and generating an in-phase signal (I signal) and a quadrature-phase signal (Q signal).

Since the final output of the channelizer 113 using the parallel probe scheme is non-multiplexed parallel data, the IQ signal mapper 115 of FIG. 4B includes a first adder 421 for adding the pilot channel signal $C_0$ and the voice channel signal $C_2$ and thus generating an I signal, and a second adder 423 for adding the control channel signal $C_1$ and the packet channel signal $C_3$ and thus generating a Q signal.

FIG. 5A is a block diagram of the PN spreader 117 shown in FIG. 1 using an IQ split method, and FIG. 5B is a block diagram of the PN spreader 117 shown in FIG. 1 using a complex spreading method. Here, a first PN code refers to a short PN code, and a second PN code refers to a long PN code.

Referring to FIG. 5A, a first PNi code generator 511 generates an in-phase PN code PNi and a first PNq code generator 513 generates a quadrature-phase PN code PNq. A second PN code generator 515 generates a long PN code commonly applied to the in-phase PN code, PNi and the quadrature-phase PN code, PNq. A multiplier 517 multiplies PNi by the second PN code, thereby generating an in-phase PN code. A multiplier 519 multiplies PNq by the second PN code, thereby generating a quadrature-phase PN code. A multiplier 520 multiplies the I signal received from the IQ signal mapper 115 by the quadrature-phase PN code and generates a spread signal PI. A multiplier 512 multiplies the Q signal received from the IQ signal mapper 115 by the in-phase PN code and generates a spread signal PQ.

Now, there will be a description of the PN spreader 117 for complex spreading shown in FIG. 5B. Referring to FIG. 5B, the first PNi code generator 511 generates the in-phase PN code PNi and the first PNq code generator 513 generates a quadrature-phase PN code PNq. The second PN code generator 515 generates a long PN code which is applied to both the PNi and PNq PN codes. The multiplier 517 multiplies PNi by the second PN code, thereby generating an in-phase PN code. Similarly, multiplier 519 multiplies PNq by the second PN code, thereby generating a quadrature-phase PN code. A multiplier 521 multiplies the I signal received from the IQ signal mapper 115 by the in-phase PN code. A multiplier 523 multiplies the Q signal received from the IQ signal mapper 115 by the in-phase PN code. A multiplier 525 multiplies the Q signal received from the IQ signal mapper 115 by the quadrature-phase PN code. A multiplier 527 multiplies the I signal received from the IQ signal mapper 115 by the quadrature-phase PN code. A subtracter 529 subtracts the output of the multiplier 525 from the output of the multiplier 521 and generates a complex-spread in-phase signal PI. An adder 531 adds the outputs of the multipliers 523 and 527 and generates a complex-spread quadrature-phase signal PQ. The PN spreader 117 of FIG. 5B offers a lower peak-to-average power ratio as compared to the topology of FIG. 5A.

FIG. 6 further illustrates the baseband modulator 119 which modulates the spread signals PI and PQ received from the PN spreader 117 shown in FIG. 5A or 5B. Referring to FIG. 6, the spread signal PI is filtered by an FIR (Finite Impulse Response) filter 615, whereas the spread signal PQ is delayed by a predetermined time in a delay 611 and filtered by an FIR filter 613. The baseband modulator 119 may operate based on OQAM (Offset Quadrature Amplitude Modulation).

A transmitter using the parallel probe method includes the channelizer 113 of FIG. 3B, the IQ signal mapper 115 of FIG. 4B, the PN spreader 117 of FIG. 5B, and the baseband modulator 119 of FIG. 6. On the other hand, a transmitter employing the serial probe method has the channelizer 113 of FIG. 3A, the IQ signal mapper 115 of FIG. 4A, the PN spreader 117 of FIG. 5A, and the baseband modulator 119 of FIG. 6.

The transmitter using the parallel probe method increases PAR, while transmitters using the serial probe method suffers a significant power variation due to a varied bit rate of a voice signal and the intermittent presence of a packet signal, thereby increasing interference.

Therefore, concurrent use of multiple channels gives rise to problems associated with an amplifier in the conventional transmitters. That is, because the pilot channel, the control channel, the voice channel, and the packet channel are simultaneously used, a peak-to-average power ratio is increased, which implies that the amplifier should exhibit excellent linearity. In particular, a terminal using only the voice channel (i.e., low speed traffic channel) without the packet channel (i.e., high speed traffic channel) may have a seriously increased peak-to-average power ratio depending on gain adjustment for channels.

SUMMARY OF THE INVENTION

An object of the present invention is to provide a spread spectrum signal generating device and method in a mobile communications system for transmitting data of multiple logical channels, where the data of logical channels having constant transmit power levels is channelized by multiplexing and orthogonal codes.

Another object of the present invention is to provide a spread spectrum signal generating device in a mobile communications system for transmitting data of multiple logical channels, where the data of logical channels having constant transmit power levels is channelized by multiplexing and the data of the other logical channels is channelized on the basis of the power level of the multiplexed channel.

To achieve the above objects, a spread spectrum signal generating device in a transmitter of a mobile communications system is provided which uses a plurality of logical channels. In the spread spectrum signal generating device, a multiplexer time multiplexes a pilot channel signal and a control channel signal which are output at constant power levels. A first orthogonal encoder orthogonally spreads the output of the multiplexer with an orthogonal code, a second orthogonal encoder orthogonally spreads voice channel data of a variable bit rate with an orthogonal code, a third orthogonal encoder orthogonally spreads packet channel data of a variable bit rate with an orthogonal code, an IQ signal mapper adds the outputs of the first and third orthogonal encoders, outputs the added signal as a first channel signal, and outputs the output of the second orthogonal encoder as a second channel signal, and a PN spreader spreads the first and second channel signals with PN codes and outputs a final spectrum spread signal. The resulting spread spectrum signal features a substantially uniform peak-to-average power ratio.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

The simultaneous transmission of pilot data, control data, voice data, and packet data tends to increase a peak-to-average power ratio in a mobile communications system for transmitting data of multiple logical channels. This increase may cause problems in the linearity of a power amplifier in a transmitter. However, the peak-to-average power ratio and the number of orthogonal codes used for channelization can be reduced by channelizing a pilot signal and a data signal through time multiplexing in accordance with the present invention.

In the conventional parallel probe method, if there exist only pilot data, control data, and voice data and the voice data has the highest bit rate in a transmitter, a power ratio of the pilot channel: control channel: and voice channel is 1:1/4:4. The resulting peak-to-average power ratio at an output terminal is about 6.95 dB. When the voice data is only an eighth of the highest bit rate, the power ratio becomes 1:1/4:1/2 and the peak-to-average power ratio increases to 7.23 dB. Here, the average energy ratio per unit time of the pilot channel to the control channel is fixed at 1:1/4. However, since the voice channel has a variable bit rate, it has an average energy which ranges from 4 times to 1/2 times the average energy of the pilot channel. The peak-to-average power ratio increases as the difference in energy between channels which are added in the IQ signal mapper 115 gets narrower.

Figure 7A:
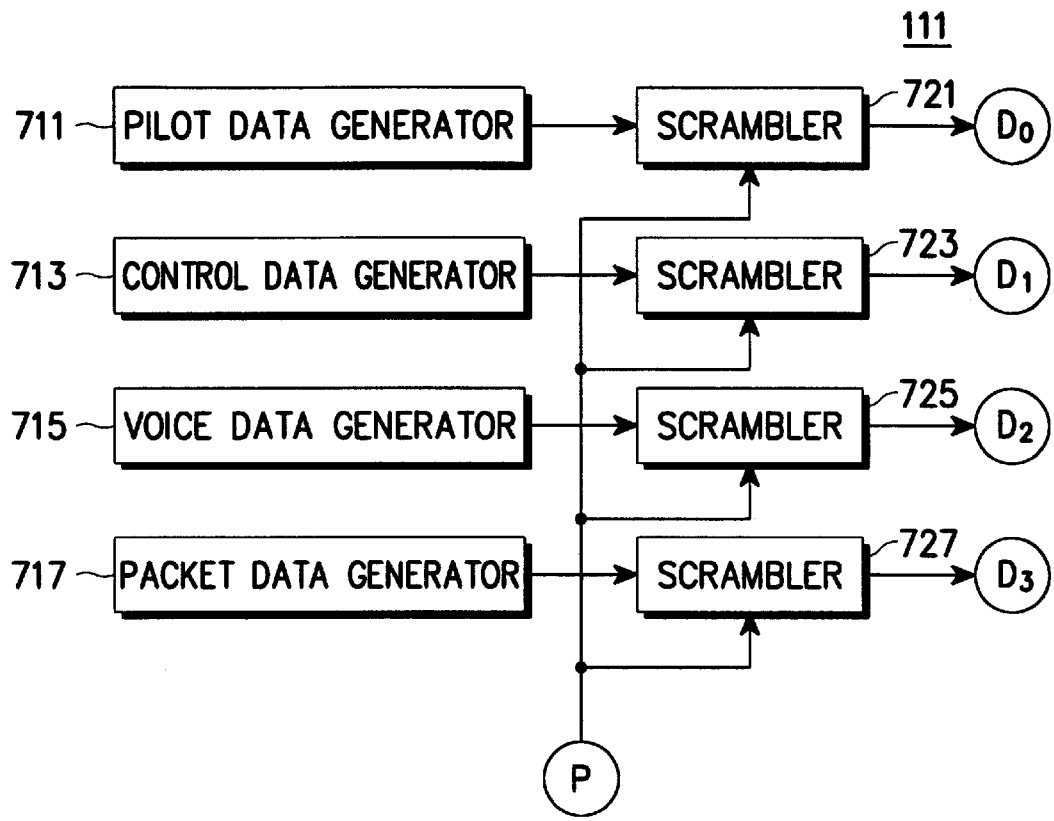
FIG. 7A is a block diagram of a logical channel data generator according to an embodiment of the present invention.
Figure 7B:
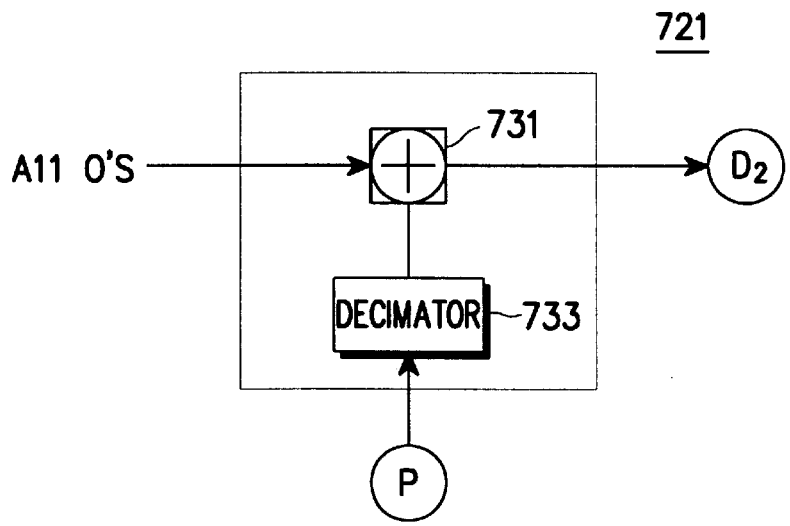
FIG. 7B is a block diagram of scramblers shown in FIG. 7A.
Figure 8:
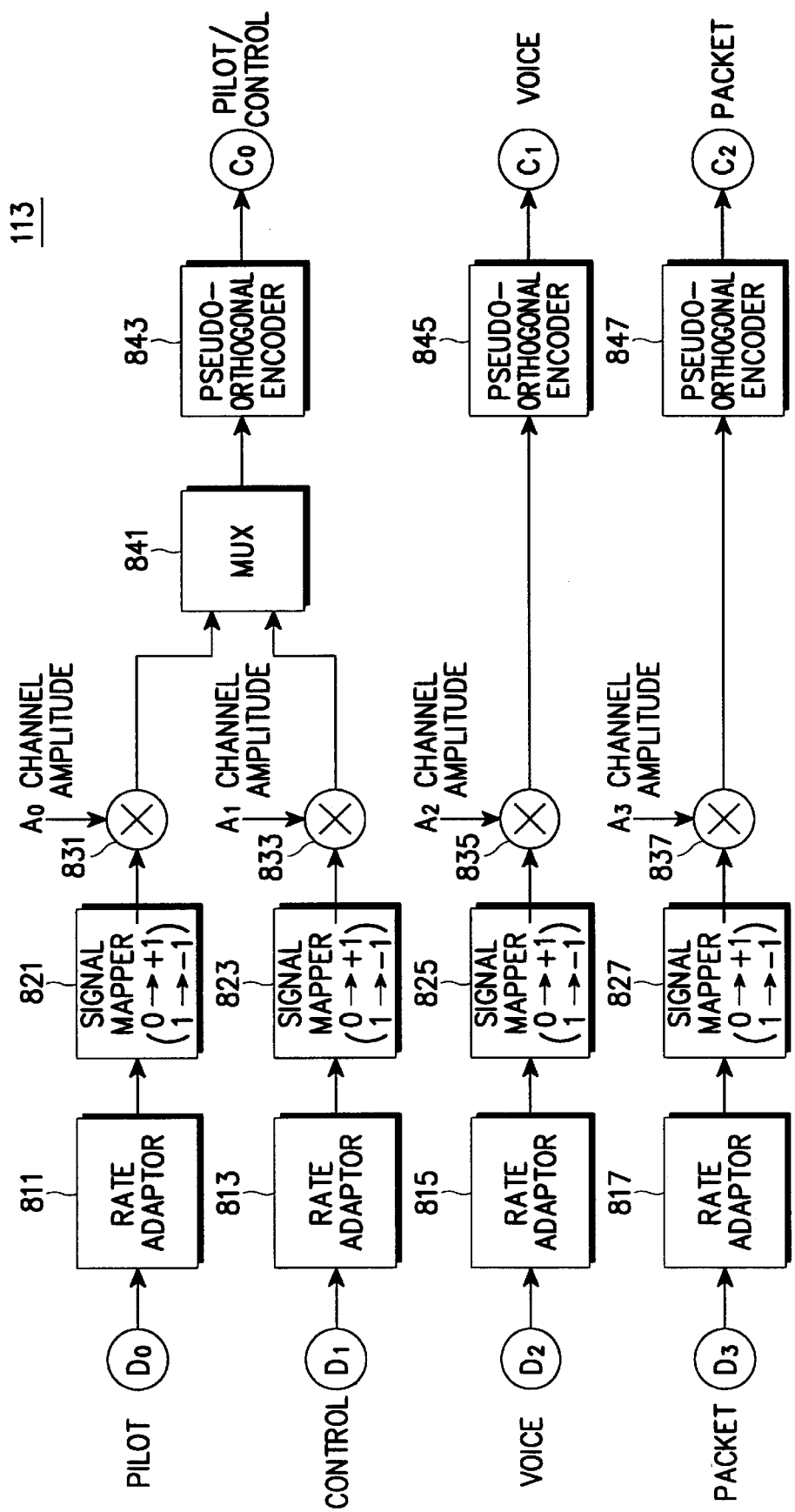
FIG. 8 is a block diagram of a channelizer according to the embodiment of the present invention.
Figure 9:
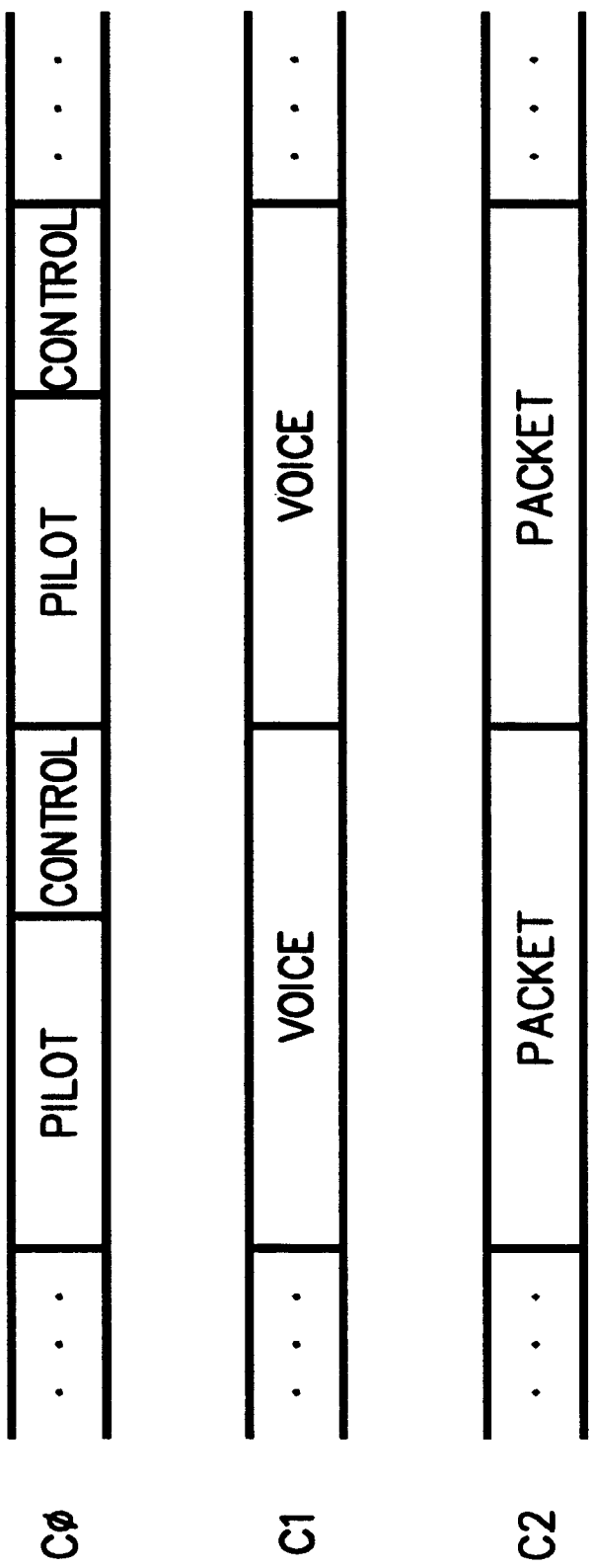
FIG. 9 illustrates output characteristics of the channelizer according to the embodiment of the present invention.

In an embodiment of the present invention relying on the above principles, the logical channel data generator 111 is configured as shown in FIGS. 7A and 7B, and the channelizer 113 is formed as shown in FIG. 8 such that the power level of the multiplexed pilot/control channel is set to be the sum of the power level of the pilot channel and the power level of the control channel in parallel probing. For example, if the power level of the pilot channel is 1 and that of the control channel is 1/4 in parallel probing, then the power level of the time multiplexed pilot/control channel in the present invention should be set to 1+1/4. The control channel is output for 4/5 time as shown in FIG. 9.

FIG. 7A is a block diagram of the logical channel data generator 111 according to the present invention. FIG. 7B is a block diagram of scramblers shown in FIG. 7A. Referring to FIG. 7A, the logical channel data generator 111 includes a pilot data generator 711, a control data generator 713, a voice data generator 715, and a packet data generator 717. The pilot data generator 711 outputs unmodulated consecutive bits of 0s. Control data generated from the control data generator 713 is composed of a power control command for power control on a forward link or other control information. The voice data generator 715 outputs data from a vocoder at a variable bit rate (VBR). The voice data output from the vocoder can be, for example, a convolutionally encoded and interleaved bit sequence. The encoded voice data is output at a VBR of 1/2, 1/4, or 1/8, increasing one bit time by twice, four times, or eight times. The packet data generator 717 has an output bit rate which is an integer multiple of 1 to 8 times the highest bit rate of the voice data generator 215. Scramblers 721 to 727 scramble the data received from the data generators 711 to 717, respectively.

Referring to FIG. 7B, a decimator 733 of the scrambler 721 to 727 decimates by a predetermined value P, and an exclusive OR gate 731 exclusive ORs the output of the data generators 711 to 717 with the output of the decimator 733. The pilot data, control data, voice data, and packet data are all encoded and interleaved. The interleaved data is exclusive ORed with the data resulting from decimating a second PN code sequence at the same bit rate as that of the interleaved data.

FIG. 8 is a block diagram of the channelizer 113 according to an embodiment of the present invention. Referring to FIG. 8, rate adaptors 811 to 817 are connected to the corresponding data generators 711 to 717, for adjusting the data transmission rates at the data generators 711 to 717. Signal mappers 821 to 827 are connected to the rate adaptors 811 to 817, respectively, for converting bits 0s and 1s of the rate-adapted data to +1s and −1s. Multipliers 831 to 837 multiply the outputs of the signal mappers 821 to 827 by the corresponding channel amplitude control signals A0 to A3. A multiplexer 841 multiplexes the outputs of the multipliers 831 and 832. The multiplexed signal is a pilot/control channel signal. A pseudo-orthogonal encoder 843 spreads the pilot/control channel signal with a multipath resistant pseudo-orthogonal code (MRPOC), thereby overcoming the problem of orthogonality loss caused by a multipath signal component. A pseudo-orthogonal encoder 845 spreads the voice data channel signal with an MRPOC, and a pseudo-orthogonal encoder 847 spreads the packet data channel signal with an MRPOC.

In the channelizer 113 of FIG. 8, if E and F are the corresponding channel gains in the conventional parallel probe, the gains A0 and A1 in the present invention have identical values computed from E and F as given by equation (1). The pilot and control channels are output for the time periods calculated by equations (2) and (3), respectively.

$$\frac{E^2}{E^2 + F^2} \quad (2)$$

$$\frac{F^2}{E^2 + F^2} \quad (3)$$

Therefore, the multiplexer 841 of FIG. 8 multiplexes the pilot and control channel signals to a signal $C_0$ as shown in FIG. 9, while the voice and packet data channel signals are output without being multiplexed. The output of the multiplexer 841, the voice data signal, and the packet data signal are spread by the pseudo-orthogonal encoders 843 to 847, thereby ensuring orthogonality which would otherwise be lost due to a multipath propagated component.

Figure 10A:
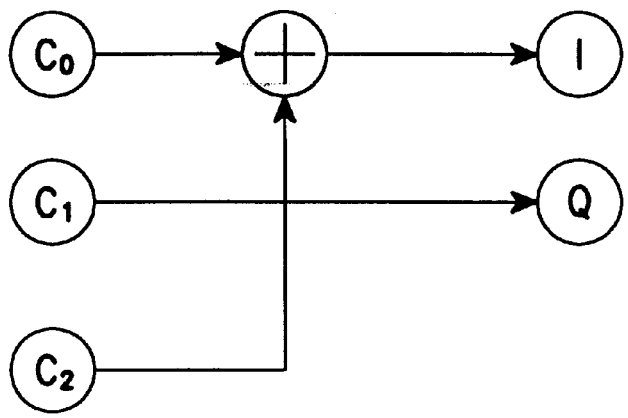
FIGS. 10A and 10B are block diagrams of an IQ signal mapper according to the embodiment of the present invention.
Figure 10B:
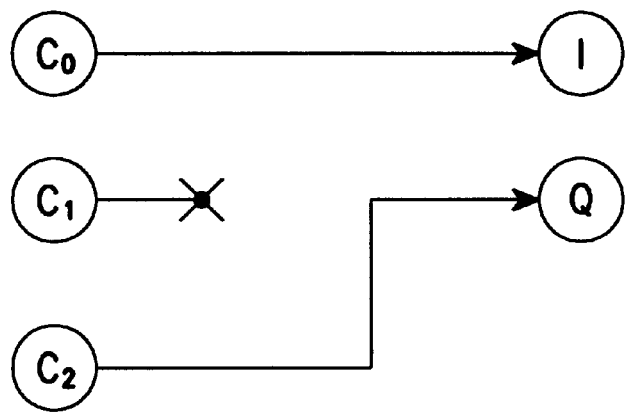

In the presence of voice data, the voice channel signal ($C_1$) is transmitted as a Q channel signal, as shown in FIG. 10A. The packet/control channel signal ($C_0$) is added to the packet data signal ($C_2$) by an adder and output as an I channel signal. In the absence of voice data, the packet data signal ($C_2$) is output as a Q channel signal and the packet/control signal ($C_0$) is output as an I channel signal, as shown in FIG. 10B. That is, when power is transmitted from the voice channel output from the channelizer 113, the IQ signal mapper 115 directs the voice channel signal in a different signal path from that of the pilot/control channel and adds the packet data and the pilot/control channel signal to form the other output signal, as shown in FIG. 10A. If the voice channel is off, the packet channel signal is output in a direction different from the pilot/control channel signal, as shown in FIG. 10B.

Figure 5A:
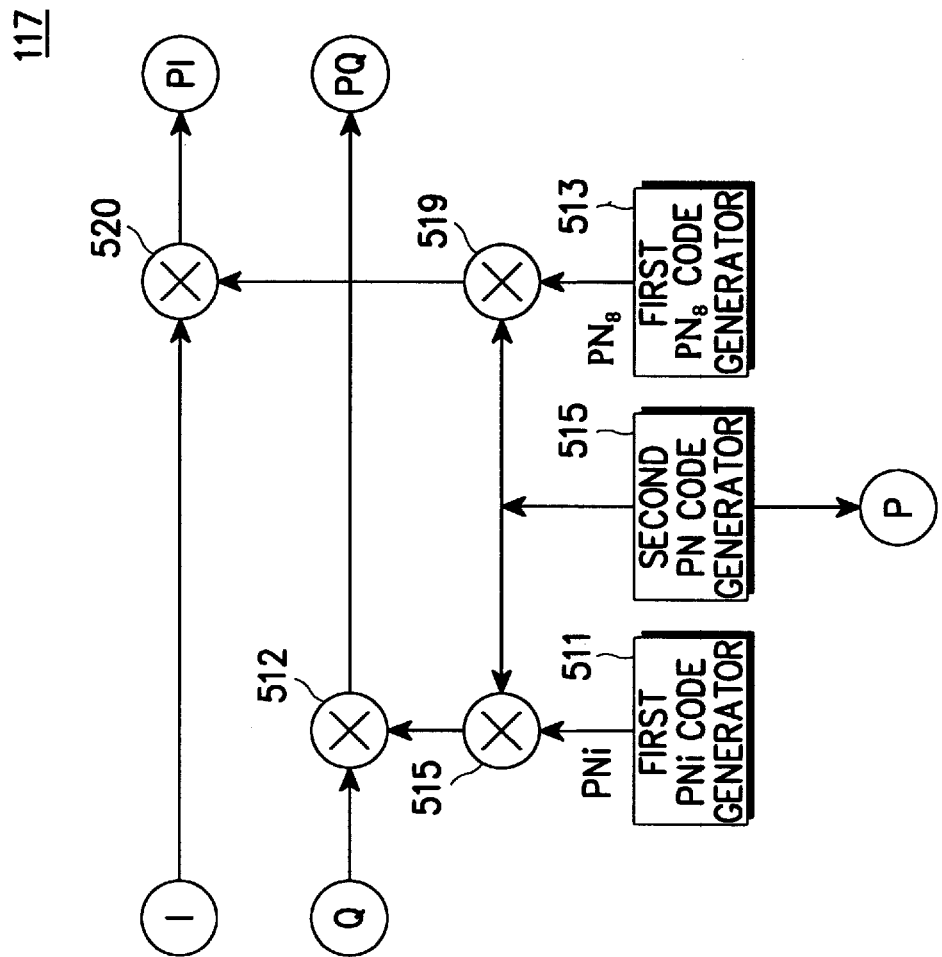
FIGS. 5A and 5B are block diagrams of a PN spreader shown in FIG. 1.
Figure 5B:
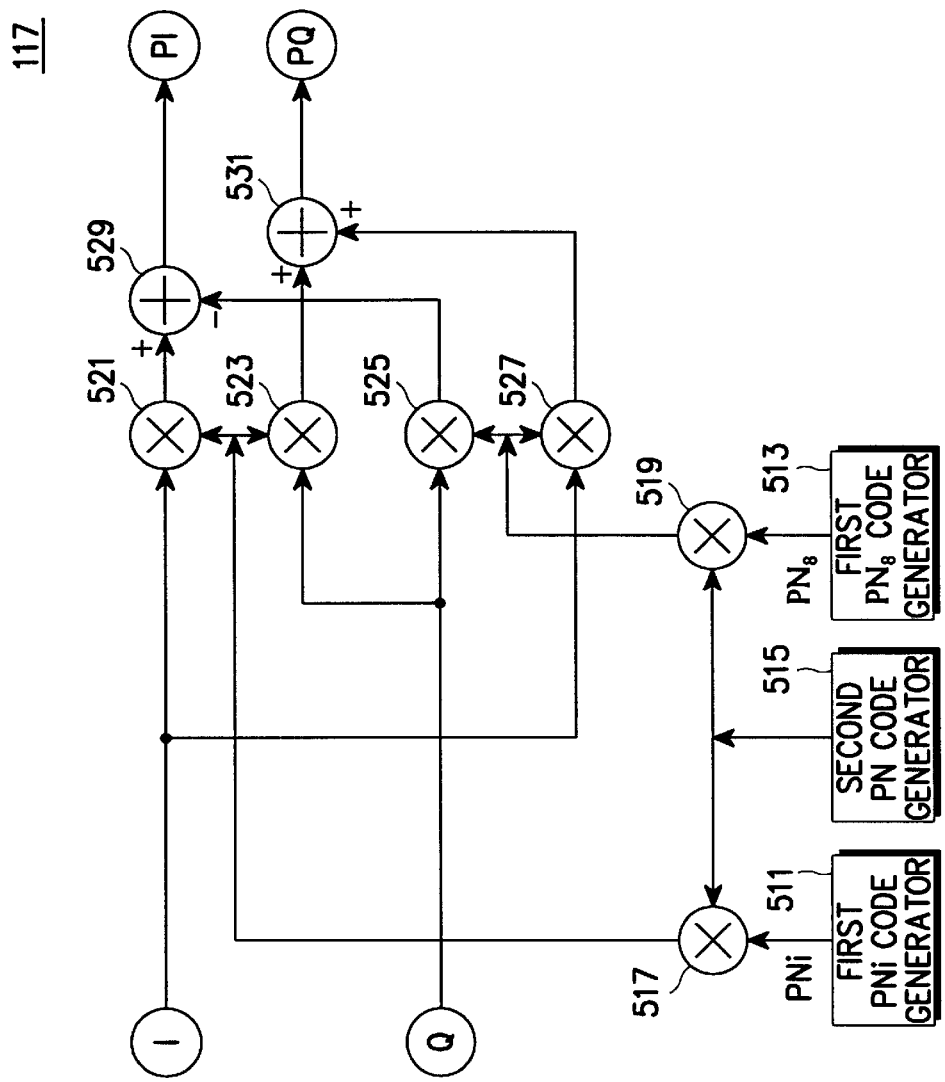
Figure 6:
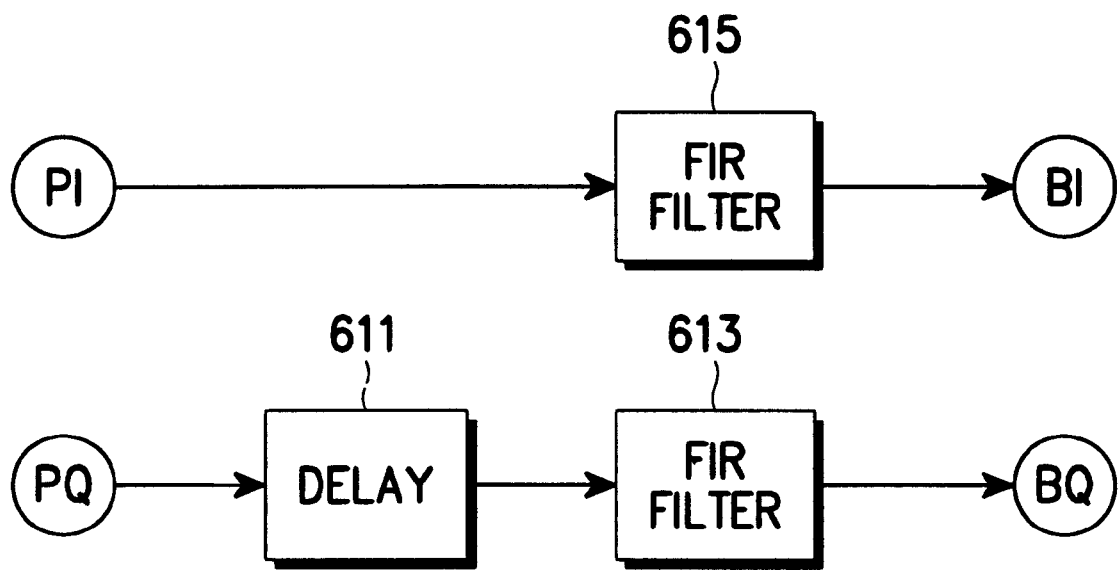
FIG. 6 is a block diagram of a baseband modulator shown in FIG. 1.

The PN spreader 117 in accordance with the present invention may be configured as shown in FIG. 5B to reduces a peak-to-average power ratio. The modulation of the present invention follows the method of FIG. 6. In this case, the peak-to-average power ratio is smaller than that in a general parallel probe method by about 1.5–1.9 dB.

Figure 1:
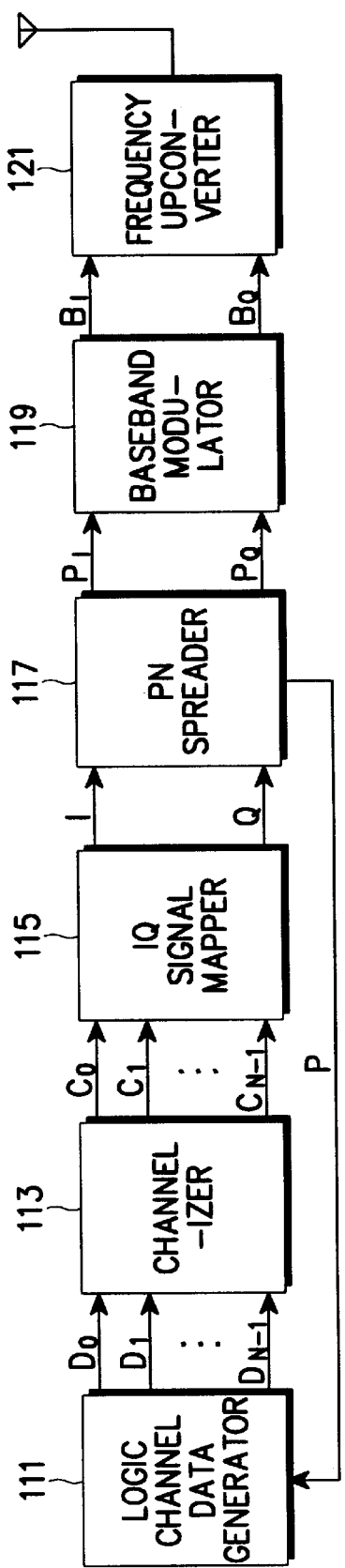
FIG. 1 is a block diagram of a spread spectrum transmitter in a mobile communications system.
Figure 2A:
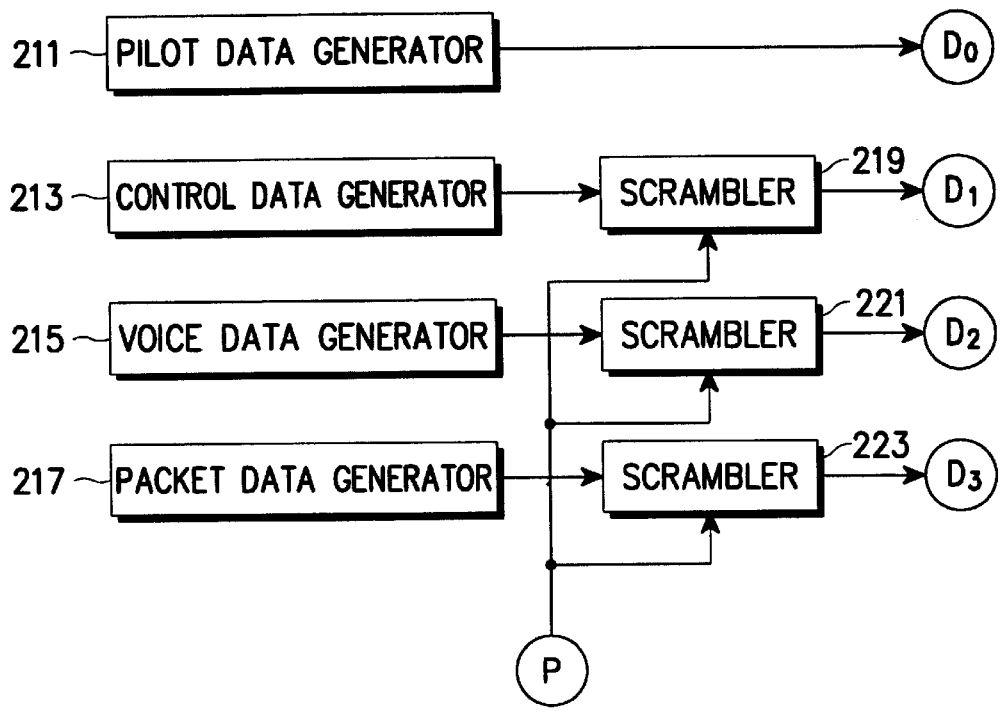
FIG. 2A is a block diagram of a logical channel data generator shown in FIG. 1.
Figure 2B:
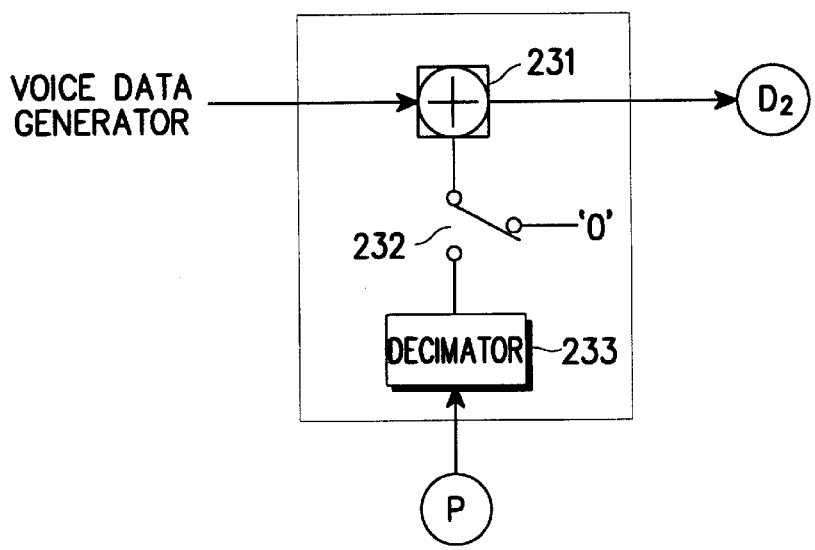
FIG. 2B is a block diagram of scramblers shown in FIG. 2A.
Figure 3A:
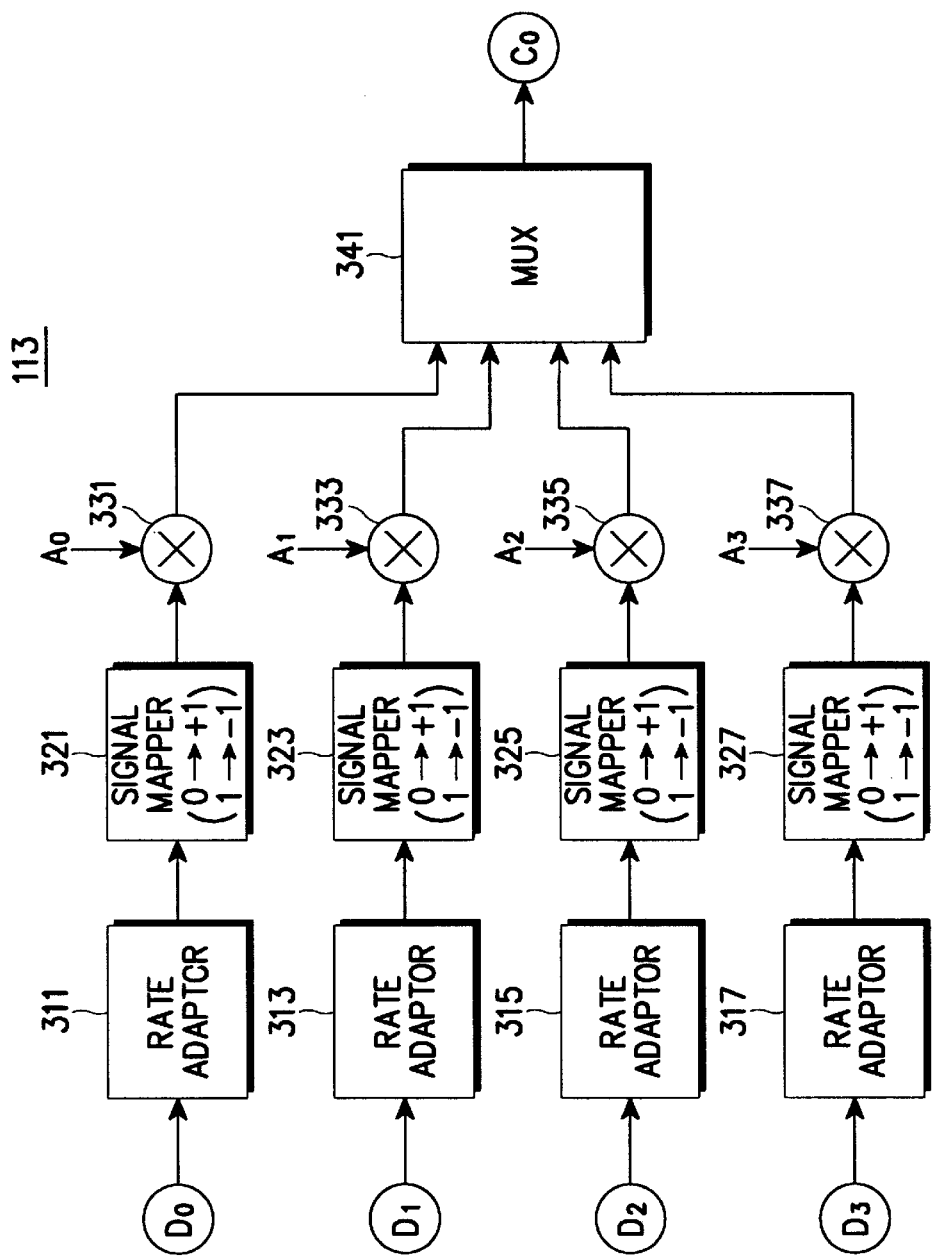
FIGS. 3A and 3B are block diagrams of a channelizer shown in FIG. 1.
Figure 3B:
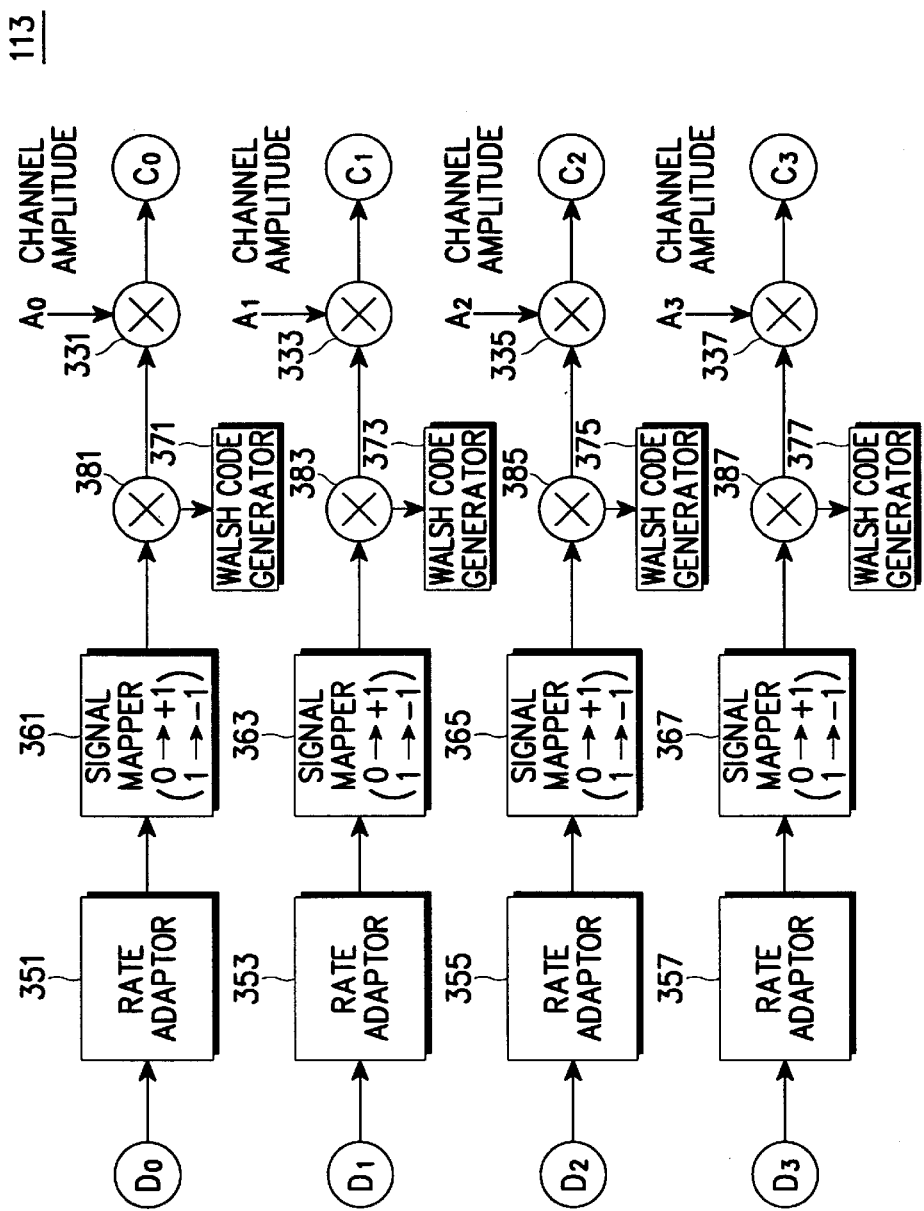
Figure 4A:
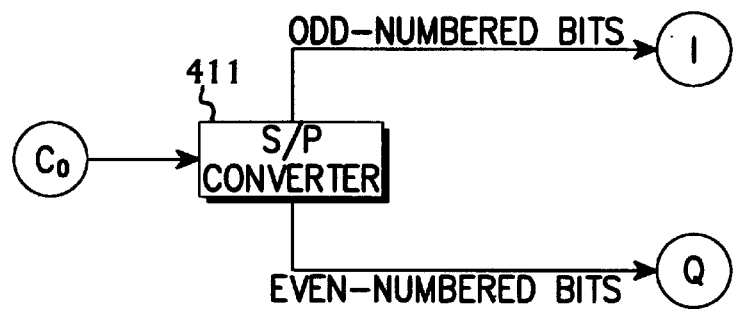
FIGS. 4A and 4B are block diagrams of an IQ signal mapper shown in FIG. 1.
Figure 4B:
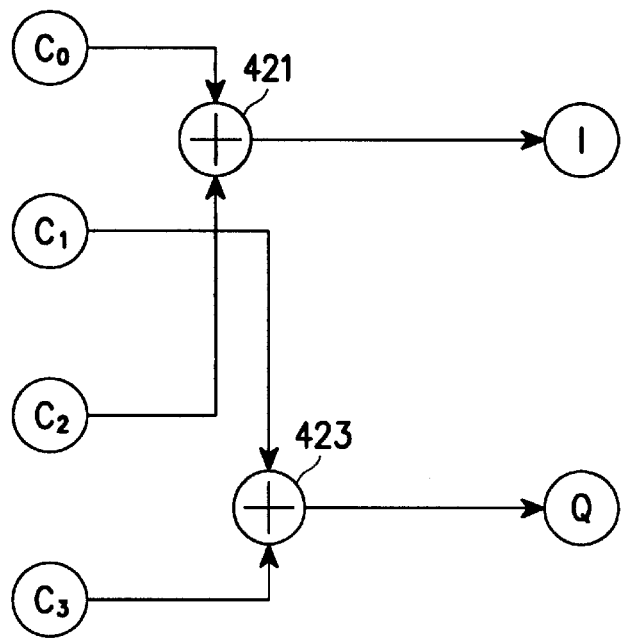

The Walsh encoders of FIG. 3B or inner codes of a pseudo-orthogonal code can be used for the pseudo-orthogonal encoders 843 to 847 of FIG. 8. Then, a PN sequence is generated with an appropriate chip rate in a PN code generator. Since pilot data is always uniform, use of the pseudo-orthogonal codes may cause interference to other users. To prevent this, the pilot data is scrambled by a scrambling sequence decimated from the second PN code generator.

As described above, a pilot signal and a data signal are channelized through time multiplexing in a mobile communications system using a plurality of logical channels such as pilot data, control data, voice data, and packet data, thereby reducing a peak-to-average power ratio and the number of orthogonal codes involved in channelization.

While the present invention has been described in detail with reference to the specific embodiment, it is a mere exemplary application. Thus, it is to be clearly understood that many variations can be made by anyone skilled in the art within the scope and spirit of the present invention.

What is claimed is:

1. A spread spectrum signal generating device in a transmitter of a mobile communications system using a pilot channel, a control channel, a voice data channel, and a packet data channel, comprising:

a multiplexer for time multiplexing a pilot channel signal and a control channel signal;

a first orthogonal encoder for orthogonally spreading the output of the multiplexer with an orthogonal code;

a second orthogonal encoder for orthogonally spreading voice data of a variable bit rate with an orthogonal code;

a third orthogonal encoder for orthogonally spreading packet data of a variable bit rate with an orthogonal code;

an IQ signal mapper for adding the outputs of the first and third orthogonal encoders, outputting the added signal as a first channel signal, and outputting the output of the second orthogonal encoder as a second channel signal; and a PN spreader for spreading the first and second channel signals with PN codes and outputting a final spread spectrum signal, whereby a peak-to-average power ratio is minimized.

2. The device of claim 1, wherein the first to third orthogonal encoders use multipath resistant pseudo-orthogonal codes (MRPOCs).

3. The device of claim 1, wherein the pilot channel signal and the control channel signal are time-multiplexed and output at substantially constant power levels.

4. A spread spectrum signal generating device in a transmitter of a mobile communications system using a pilot channel, a control channel, a voice data channel, and a packet data channel, comprising:

a multiplexer for time multiplexing a pilot channel signal and a control channel signal;

a first orthogonal encoder for orthogonally spreading the output of the multiplexer with an orthogonal code;

a second orthogonal encoder for orthogonally spreading voice data of a variable bit rate with an orthogonal code;

a third orthogonal encoder for orthogonally spreading packet data of a variable bit rate with an orthogonal code;

an IQ signal mapper for adding the outputs of the first and third orthogonal encoders, outputting the added signal as a first channel signal, and outputting the output of the second orthogonal encoder as a second channel signal, in the presence of a voice signal, and outputting the outputs of the first and third orthogonal encoders as a first channel signal and a second channel signal, respectively, in the absence of a voice signal; and a PN spreader for spreading the first and second channel signals with PN codes and outputting a final spectrum spread signal, whereby a peak-to-average power ratio is minimized.

5. The device of claim 4, wherein the output of the multiplexer is a substantially constant power level.

6. The device of claim 4, wherein the first to third orthogonal encoders use multipath resistant pseudo-orthogonal codes.

7. A spread spectrum signal generating device in a transmitter of a mobile communications system, comprising:

a logical channel data generator for generating pilot channel data, control channel data, voice channel data, and packet channel data;

a channelizer for time multiplexing the pilot and control channel data, and orthogonally encoding the multiplexed signal, the voice signal, and the packet signal;

an IQ signal mapper for adding the multiplexed signal and the packet signal received from the channelizer, outputting the added signal as a first channel signal, and outputting the voice signal received from the channelizer as a second channel signal;

a PN spreader for complex-multiplying the first and second channel signal received from the IQ signal mapper by PN codes;

a baseband modulator for baseband-pass-filtering the signal received from the PN spreader and modulating the filtered signal; and a frequency upconverter for upconverting the frequency of the output of the baseband modulator to a transmission frequency.

8. The device of claim 7, wherein the multiplexed signal is output at a substantially constant power level.

9. The device of claim 7, wherein the pilot channel data from the logical channel data generationis scrambled to improve interference performance.

10. The device of claim 7, wherein the channelizer comprises:

a plurality of rate adaptors for adjusting the rates of the corresponding pilot, control, voice, and packet channel data;

a plurality of signal mappers for converting bits 0s and 1s of signals received from the corresponding rate adaptors to +1s and −1s, respectively;

a plurality of channel amplitude controllers for multiplying the outputs of the signal mappers by corresponding channel amplitude values;

a multiplexer for time multiplexing the outputs of the pilot and control channel amplitude controllers;

a first pseudo-orthogonal encoder for multiplying the output of the multiplexer by an orthogonal code;

a second pseudo-orthogonal encoder for multiplying the output of the voice channel amplitude controller by an orthogonal code; and a third pseudo-orthogonal encoder for multiplying the output of the packet channel amplitude controller by an orthogonal code.

11. The device of claim 7, wherein the orthogonal codes take the form of multipath resistant pseudo-orthogonal codes.

12. A spread spectrum signal generating device in a transmitter of a mobile communications system, comprising:

means for generating pilot channel data, control channel data, voice channel data, and packet channel data;

means for time multiplexing the pilot and control channel data and orthogonally encoding the multiplexed signal, the voice signal, and the packet signal;

means for adding the multiplexed signal and the packet signal received from the channelizer, outputting the added signal as a first channel signal, and outputting the voice signal received from the channelizer as a second channel signal;

means for complex-multiplying the first and second channel signal by PN codes;

means for filtering and modulating the signal received from the PN spreader; and means for upconverting the frequency of the modulated signal to a transmission frequency.

13. A spread spectrum signal generating method in a transmitter of a mobile communications system using a pilot channel, a control channel, a voice data channel, and a packet data channel, comprising the steps of:

time multiplexing a pilot channel signal and a control channel signal;

generating a first orthogonal encoded signal by multiplying the time multiplexed signal by an orthogonal code;

generating a second orthogonal encoded signal by multiplying the voice data by an orthogonal code;

generating a third orthogonal encoded signal by multiplying the packet data by an orthogonal code;

adding the first and third orthogonal encoded signals, outputting the added signal as a first channel signal, and outputting the second orthogonal encoded signal as a second channel signal; and spreading the first and second channel signals with PN codes and outputting a final spread spectrum signal, whereby a substantially minimal power ratio is maintained.

14. The method as claimed in claim 13, wherein said step of time multiplexing generates a signal of substantially constant power output.

15. A spread spectrum signal generating method in a transmitter of a mobile communications system using a pilot channel, a control channel, a voice data channel, and a packet data channel, comprising the steps of:

time multiplexing a pilot channel signal and a control channel signal which are transmitted at substantially constant power levels;

generating a first orthogonal encoded signal by multiplying the time multiplexed signal by an orthogonal code;

generating a second orthogonal encoded signal by multiplying the voice data by an orthogonal code;

generating a third orthogonal encoded signal by multiplying the packet data by an orthogonal code;

determining whether there exists a voice signal;

adding the first and third orthogonal encoded signals, outputting the added signal as a first channel signal, and outputting the second orthogonal encoded signal as a second channel signal, in the presence of the voice signal;

outputting the first orthogonal encoded signal as a first channel signal and the third orthogonal encoded signal as a second channel signal, in the absence of the voice signal; and spreading the first and second channel signals with PN codes and outputting a final spread spectrum signal, whereby a substantially uniform peak-to-average power ratio is maintained.

16. A spread spectrum signal generating method in a transmitter of a mobile communications system, comprising:
   (1) generating pilot channel data, control channel data, voice channel data, and packet channel data;
   (2) time multiplexing the pilot and control channel data output at substantially constant power levels, and orthogonally encoding the multiplexed signal, the voice signal, and the packet signal;
   (3) adding the multiplexed signal and the packet signal, outputting the added signal as a first channel signal, and outputting the voice signal as a second channel signal;
   (4) complex-multiplying the first and second channel signal by PN codes;
   (5) baseband-pass-filtering the PN-spread signal and modulating the filtered signal; and
   (6) upconverting the frequency of the modulated signal to a transmission frequency.

17. The method of claim 16, wherein step (2) comprises the substeps of:
   adjusting the rates of the corresponding pilot, control, voice, and packet channel data;
   converting 0s and 1s of the rate-adapted signals to +1s and −1s, respectively;
   multiplying the converted signals by corresponding channel amplitude values;
   time multiplexing the amplitude-controlled pilot and control channel signals;
   generating a first pseudo-orthogonal encoded signal by multiplying the time multiplied signal by a multipath resistant pseudo-orthogonal code (MRPOC);
   generating a second pseudo-orthogonal encoded signal by multiplying the amplitude-controlled voice signal by an MRPOC; and
   generating a third pseudo-orthogonal encoded signal by multiplying the amplitude-controlled packet signal by an MRPOC.

* * * * *